July 12, 1960 G. R. MARKOW 2,945,218

MONITORING SYSTEM INCLUDING A MAGNETIC AMPLIFIER

Filed May 19, 1955 3 Sheets-Sheet 1

INVENTOR.
GEORGE R. MARKOW
BY
Raymond W. Jenkins
ATTORNEY

MONITORING SYSTEM INCLUDING A MAGNETIC AMPLIFIER

Filed May 19, 1955

*INVENTOR.*
GEORGE R. MARKOW

*BY* Raymond W. Jenkins
*ATTORNEY*

INVENTOR.
GEORGE R. MARKOW
BY Raymond W. Jenkins
ATTORNEY

United States Patent Office 2,945,218

Patented July 12, 1960

2,945,218

MONITORING SYSTEM INCLUDING A MAGNETIC AMPLIFIER

George R. Markow, Endicott, N.Y., assignor to Bailey Meter Company, a corporation of Delaware Filed May 19, 1955, Ser. No. 509,628

7 Claims. (Cl. 340—222)

This invention relates to electro-magnetic circuits, and complete systems including these circuits, for the detection and manifestation and/or control of the value of variables.

The employment of magnetic amplifier circuits for response to electric signals representative of a variable is well established. More specifically, it is generally appreciated that the electrical outputs of these magnetic amplifier circuits may be utilized to control electro-mechanical devices to produce motion in accordance with the magnitude of the electrical output. The present invention is embodied in the circuit, and associated structure, of a magnetic amplifier which responds to an electrical signal representative of a variable to produce a manifestation in accordance with a predetermined value of the variable which may be utilized in control of that, or another, variable.

The magnetic amplifier circuit utilized to embody the invention is generally identified as a self-saturating circuit, controlled by a D.-C. signal, and having a D.-C. voltage output. The reactor of the magnetic amplifier is controlled by windings energized by A.-C. signal, and these windings are mounted on any of the conventional forms of magnetic path structures to form the reactor. More specifically, the self-saturating circuit is utilized in a single-ended, single-stage, form.

As representative of circuits of this type, Horton 2,594,022 discloses a magnetic amplifier actuating a relay of the solenoid-type, controlling the variable to which the magnetic amplifier is responsive. Other diagrammatic representations of magnetic amplifier circuits, balanceable networks controlling the magnetic amplifier inputs and relay devices responsive to the output of a magnetic amplifier circuit are found in at least Logan 2,068,188; Downie 2,578,405; and Graves 2,516,563. These disclosures have specific, and unique, problems. The present inveniton is embodied in a more complete system than represented by these disclosures. The present invention brings together, in a single housing, the elements of the system, providing a unitary location for observation and control of the function of the system.

A primary object of the present invention is to provide a complete condition-monitoring system employing a magnetic amplifier circuit which will manifest and/or control the monitored, or another, condition.

Another object of the invention is to provide a magnetic amplifier circuit which will improve the actuation of electro-mechanical devices manifesting and/or controlling conditions.

Another object of the invention is to provide a means for adjusting the dead-band between pick-up and drop-out electrical values in the output of a magnetic amplifier circuit controlling an electro-mechanical relay.

Another object of the invention is to provide a unitary location for selecting the pick-up and drop-out values with which a magnetic amplifier circuit actuates a relay, manual means for controlling the connection between the magnetic amplifier and relay, and means for manifesting the relay actuation.

Another object of the invention is to provide a means for readily ascertaining the operativeness of the means manifesting operativeness of the relay.

In the drawings:

Fig. 1 is a perspective view of a unitary housing supporting the various structures which embody the present invention.

Fig. 2 offers an alternate perspective view of the front of the housing of Fig. 1 with the front cover open to permit accessibility to certain structure of the invention.

Figure 1:
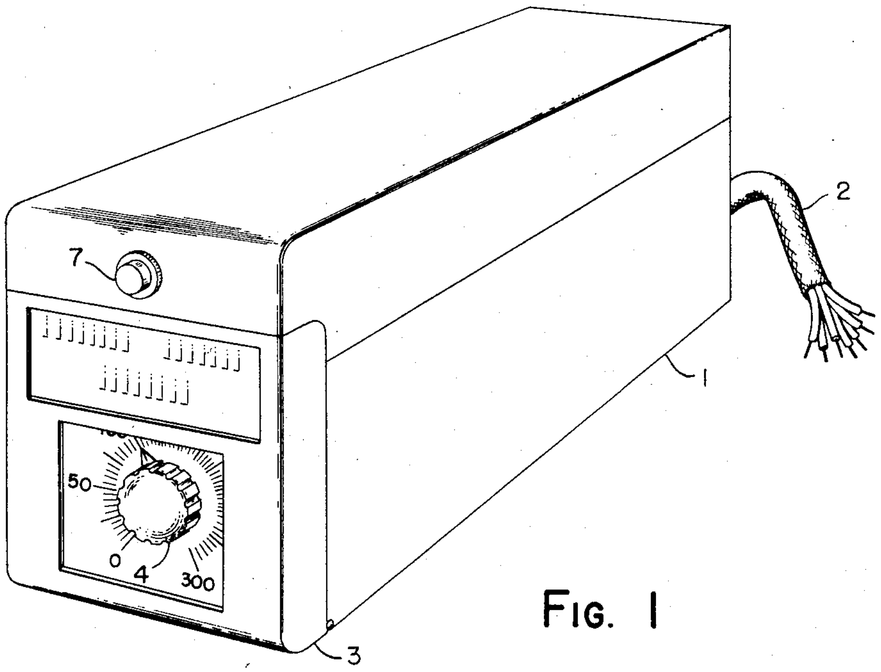

Referring to Fig. 1, a unitary housing is shown in perspective as enclosing, or supporting, the pertinent structure in which the present invention is embodied. Housing 1 provides a single "station" which can be observed and at which adjustment of the manifestations and/or control actions of the system can be made. The housing lends itself readily to mounting on a panel, or independently, for observation of, and operation by, operating personnel. The input to, and output from, this housing is in the form of electrical signals passing over the wires of cable 2.

Figure 2:
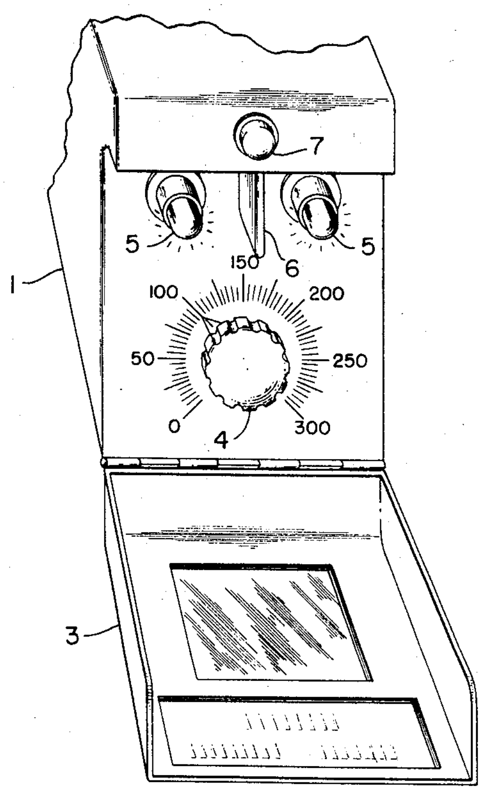

Fig. 2 is a partial view of the housing of Fig. 1, from another angle, and with the cover, or lid, 3 swung open to expose manifesting and control structure. Knob 4 can be manually manipulated by operating personnel to predetermined the condition values at which the electro-mechanical motive means of the system is actuated. The lights 5 are energized by the system to provide annuciation of the operation of the motive means. A dividing wall 6 is provided between the two lights 5.

When lid 3 is swung to the normal position shown in Fig. 1, a translucent window mounted on its face is illuminated by the lights 5. Any desired information may be scribed upon this translucent window. By positioning dividing wall 6 between lights 5, failure of one of the lights will cause an obvious unbalance in illumination of the translucent window in lid 3. This provision for ready detection of this malfunction will militate against eventual failure of both lights 5 from going undetected with consequent loss of available manifestation of the actuation of the motive means of the system.

Manual reset button 7 is provided on the face of housing 1, above lid 3, for the ready manipulation of operating personnel. The system operates so that when the value of the condition selected at knob 4 is exceeded, the motive means is actuated. Subsequent control of the value of the condition, bringing it back within the predetermined normal range, is not intended to automatically restore the manifestation of normal operation of the system. However, manipulation of reset button 7 will restore the circuit to the motive means. With the condition within normal range, the motive means will be held in its normal position.

Figure 3:
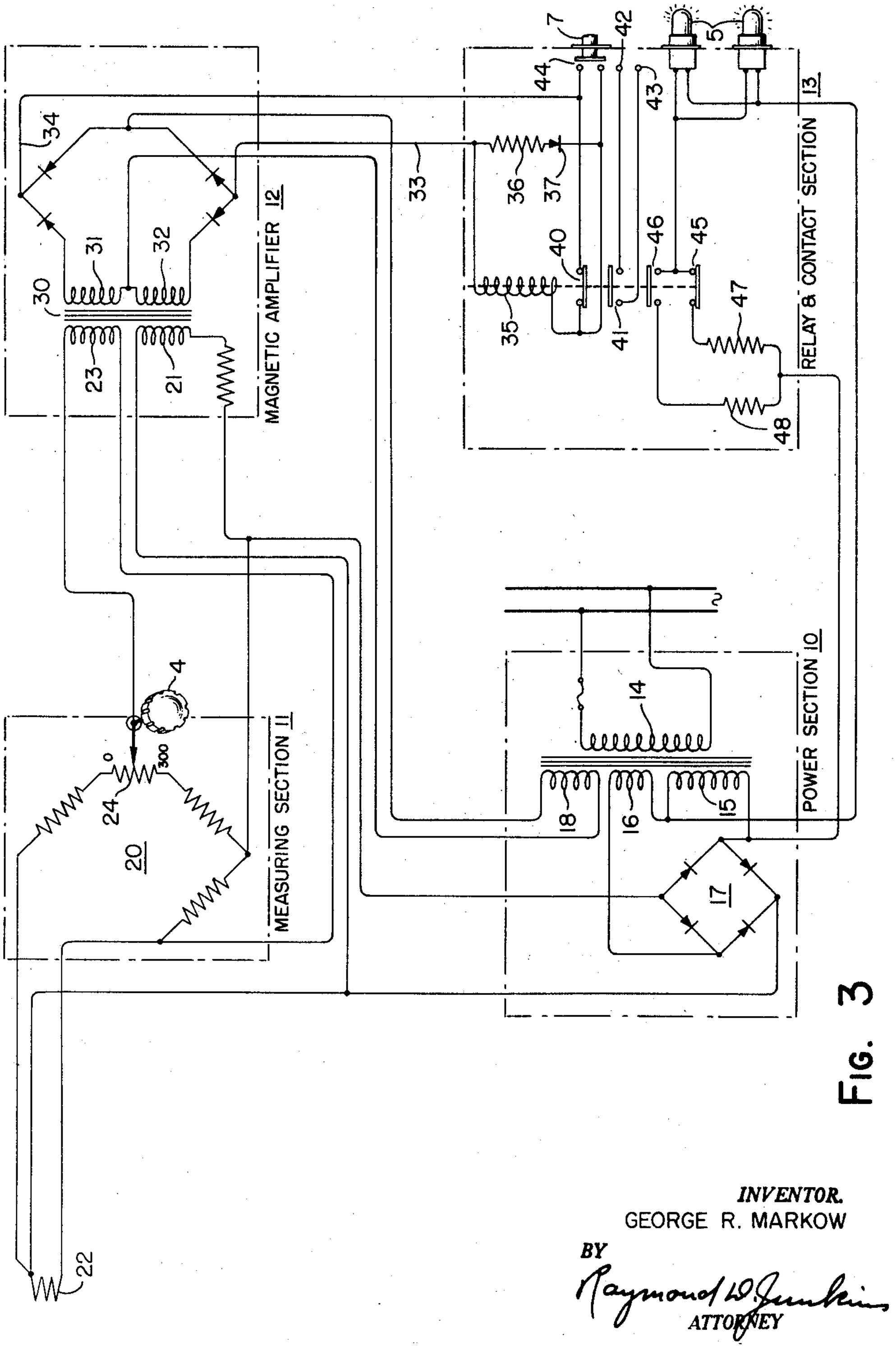
Fig. 3 is a diagrammatic representation of the complete electric circuit of the system.

Refer now to the electric circuit of Fig. 3 which has been divided into four sections to facilitate understanding. Power section 10 provides basic energization for the entire circuit. Measuring section 11 is characterized by a balanceable electric network whose adjustable set-point is controlled through knob 4. Magnetic amplifier section 12 takes the relatively low magnitude of the output of section 11 and increases it to a value sufficiently large for actuating an electro-mechanical motive means in section 13.

Relay and contact section 13 receives the output of section 12 in a coil of a solenoid relay as the motive means. The electric switches controlled by the solenoid relay annunciate and/or control the value of the condition detected by the measuring section 11, or another variable condition. The circuit of lights 5 is controlled by these electric switches. A circuit to the control mechanism, not disclosed, is completed through these switches. Additionally the switches control the circuit between section 12 and section 13 and reset button 7 completes the circuit at the will of the operator after the switches have broken it.

*Power section 10*

Power section 10 is dominated by a transformer whose primary 14 is connected to a line supply and upon which various secondary windings are mounted for supplying the other sections of the circuit. A demodulator bridge of rectifiers is provided to invert the A.-C. of one set of secondaries to give required D.-C. energization for the measuring and magnetic amplifier sections.

Specifically, secondary 15 supplies the annunciating lights 5 which manifest the solenoid relay actuation in section 13. Secondaries 15 and 16 form a set to supply the demodulator bridge 17. Secondary 18 supplies the output bridge of the magnetic amplifier section 12, comprised of output windings and rectifiers in an arrangement to be subsequently described.

*Measuring section 11*

Demodulating bridge 17, of power section 10, simultaneously supplies measuring bridge 20 and reactor bias winding 21. The operation of magnetic amplifier section 12 depends upon D.-C. input signals. Demodulating bridge 17 provides this necessary characteristic to the input signal.

Although measuring bridge 20 is supplied D.-C. energization from bridge 17, it is otherwise a conventional Wheatstone bridge. Its four resistors are arranged in two pairs of adjacent bridge legs, and one of its resistors, leg 22, is directly exposed to a variable condition. The present embodiment assumes a temperature condition is to be monitored, and leg 22 is exposed directly thereto in order that its resistance will be varied by the temperature condition. Therefore, variation in the temperature condition will change the resistance of leg 22 and unbalance bridge 20 to establish a D.-C. signal in output winding 23 which is representative of the temperature monitored.

In order to determine the value of the temperature condition which will balance bridge 20, potentiometer 24 is provided. Potentiometer 24 has its resistance divided between the two adjacent pairs of legs of bridge 20 by positioning of its contact. As previously indicated, this division is manually determined by manipulation of knob 4, mechanically linked to the contact of potentiometer 24.

*Magnetic amplifier section 12*

Magnetic amplifier section 12 is dominated by magnetic path 30 which is illustrated here in the convention used for transformer disclosure. It is to be understood that the magnetic path may be given various specific forms, familiar in the art of magnetic amplifiers. Regardless of the specific form given path 30, there is mounted thereon winding 23 and bias winding 21 as well as output windings 31 and 32. This combination of magnetic path and windings mounted thereon is commonly referred to as the reactor of the magnetic amplifier.

The output windings 31 and 32, and four rectifiers, form an output bridge circuit for the reactor. This bridge is energized by secondary 18 of power section 10 and establishes an output voltage between leads 33 and 34. The leads 33 and 34 are arranged in circuit with solenoid coil 35 of relay and contact section 13.

Although other forms may be utilized, the preferred form of magnetic path 30 is visualized here as toroidal and divided into two halves to form the center of the characteristic single-ended, self-saturating magnetic amplifier circuit found in each half of the first two stages of the push-pull amplifier of application S.N. 344,120, filed March 23, 1953, which issued May 14, 1957 as United States Patent No. 2,792,541. Similar to the arrangement in that application, secondary 18 supplies the pair of output windings 31 and 32. The output windings and rectifiers form the bridge with two adjacent legs, each including an output winding and a rectifier. The other two adjacent legs each include a single rectifier. The entire bridge, then, is supplied by secondary 18 and delivers a D.-C. potential to output leads 33 and 34.

Basic electro-magnetic theory is tempered in explaining the interaction between the input and output windings of this saturable reactor of section 12. Practical aspects of this function are generally well known. The saturation curve of magnetic material is familiar to those skilled in this art, and the variation of the reactance of a winding mounted on a core of magnetic material, over the range of core magnetization, is well established. This fundamental characteristic is used in the present invention in the conventional manner.

The core of magnetic material is selectively preset by the magnitude of the constant D.-C. placed in winding 21 by bridge 17 of power section 10. Flux, generated by the currents in windings 21 and 23 is established to oppose or aid the flux of the output windings 31 and 32. The net M.M.F. of windings 21 and 23 then varies the reactance of the output windings from a point of selected sensitivity, or change, along the saturation curve of the reactor. This is, basically, the end result of the well-understood electromagnetic circuit theory of saturable core reactors. The specific result, of course, is the establishment of a variable D.-C. potential between output leads 33 and 34, representative of the D.-C. input of winding 23 and the variable condition to which leg 22 is exposed.

*Relay and contact section 13*

As previously indicated, section 13 is dominated by the solenoid relay of coil 35. This electro-mechanical relay is, therefore, receptive to the D.-C. output of section 12, as established between leads 33 and 34. The result of this energization is that coil 35 exerts an electromagnetic force on a core mechanically connected to actuate a series of electric switches. As broadly indicated, the circuits of these switches render the annunciation and/or control which the system provides as an object.

In considering the circuit between leads 33 and 34, with coil 35, the arrangement of resistance 36 and rectifier 37 is examined. The combination of these structures, in series, and shunting coil 35 as a unit, constitutes an important feature in the present invention.

It has been conventional in the prior art to provide a positive feed-back loop, either to the input winding or to a separate feed-back winding of the reactor of magnetic amplifiers having resistive loads. Magnetic amplifiers with inductive loads exhibit varying degrees of internal positive feed-back. It is the present discovery that, by varying the value of resistor 36, arranged in series with rectifier 37, the amount of this internal positive feed-back is controlled. In effect, this variation of resistor 36 is a variation of the effective resistance of rectifier 37. Control is thereby obtained over the amount of internal positive feed-back to any degree desired.

Figure 4:
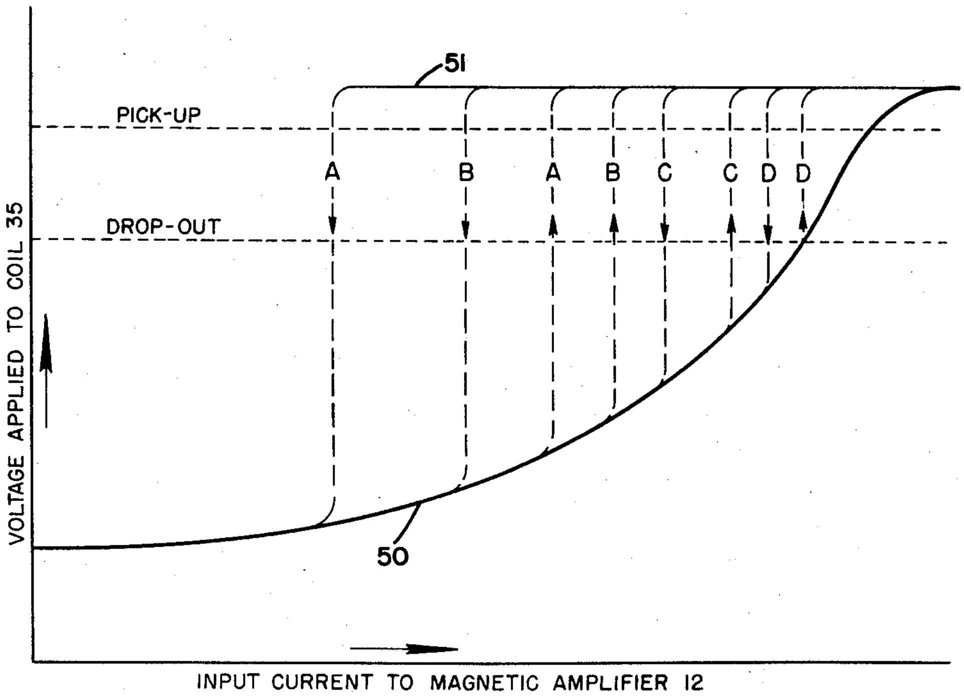
Fig. 4 is a graphical representation of the function of the magnetic amplifier and relay circuit.

The function obtained by this combination is to be more fully illustrated through means of the curves of Fig. 4. In general, variation of the value of resistor 36 shifts the magnetization curves of the reactor along the range of input values. The dead-band of relay actuation is narrowed as the value of the resistance is decreased. As a practical matter, the calibration of the function of section 12 and section 13 becomes a matter of adjusting the value of resistor 36, to achieve a satisfactory dead-band, and an adjustment of the value of bias D.-C. in winding 21, to shift the magnetization curves to the desired relationship with respect to the range of input values to section 12.

With the explanation complete down to the actuation of the solenoid relay under the direction of the preceding circuits, the functions obtained by the solenoid-actuated switches may be examined. The circuit of coil 35 and leads 33 and 34 is completed through normally closed switch 40. The relay may be said to be illustrated in its "picked-up" position, the value of D.-C. voltage in coil 35 being above a predetermined value. When the output from section 12 falls below the predetermined value, coil 35 is no longer able to hold switch 40 closed, and switch 41 open, against a predetermined spring force. Closure of switch 41 completes the circuit between terminals 42 and 43, with consequent actuation of alarm and/or control apparatus not disclosed, but presumably connected to terminals 42 and 43. The relay is then described as "dropped-out."

The mechanical connection between the core of coil 35 and the switches is adjustable. If the connection to switch 40 is adjusted to actuate that switch slightly ahead of the other switches, positive action is assured. With switch 40 broken, the core falls positively to its "dropped-out" position under predetermined spring force of the relay.

When the magnitude of D.-C. voltage between leads 33 and 34 is again raised above the predetermined value, coil 35 will not be automatically energized to open switch 41 and closed switch 40. It will be necessary for switch 44 to be momentarily closed by manually depressing reset button 7. Only then, if the available D.-C. voltage between leads 33 and 34 is sufficiently high, will coil 35 be energized to pick-up the core and actuate the relay switches, closing switch 40 and opening switch 41.

Any component failure within the system which causes decrease of the D.-C. voltage between leads 33 and 34 will cause a fail-safe function. Lowering of the magnitude of the D.-C. voltage applied to coil 35, below the predetermined value, will cause the relay to drop-out and sound the alarm, or take the desired control action, with the circuits completed through switch 41 and attached to terminals 42 and 43.

Paralleling the actuation of switches 41 and 42 is the actuation of switches 45 and 46. These switches are also mechanically connected to the core actuated by the force generated in coil 35.

Switch 45 is normally closed to complete the circuit between secondary winding 15 and lights 5. Switch 46 is normally opened. Switch 45 normally places resistance 47 in the secondary 15, lights 5 circuit. The value of this resistance 47 is selected to give a predetermined level of illumination to lights 5. Thus, with switch 45 closed, lights 5 serve to annunciate the normal operation of the system in as it monitors the variable condition within its predetermined normal range.

When the solenoid relay is dropped-out, indicating the value of the monitored condition has exceeded its normal range, switch 45 is opened, and switch 46 is closed to include resistance 48 in circuit with secondary 15 and lights 5. The size of resistance 48 is selected to raise the level of illumination of lights 5 a material amount over that established by resistance 47. Thus the increase in the level of illumination of lights 5 will indicate that the relay has been dropped-out and that alarm and/or control action is being taken through terminals 42 and 43.

Turning now to Fig. 4, there is graphically illustrated the function of the magnetic amplifier section 12 and relay of section 13, as a combination. The function is analyzed against a plot of values of input current to the reactor of the magnetic amplifier and values of D.-C. output voltage of the magnetic amplifier appearing across coil 35. The values of the voltage across coil 35 which will pick-up and drop-out the relay of coil 35 have been indicated by horizontal reference lines across the curves.

Beginning with a minimum value of input current to the magnetic amplifier, curve 50 is seen as a common origin of the plots of voltage values which appear across coil 35 as the input current increases. Assuming that the value of resistor 36 is relatively high, the load on the magnetic amplifier is characterized as substantially inductive, and the input current is observed as increasing along curve 50 until the voltage suddenly arises along the up-curve A to curve 51. Of course, the relay of coil 35 is then picked-up as the pick-up value coil 35 voltage is exceeded. The assumption is then made that the normal range of operation of the system will vary at input current values to the magnetic amplifier along curve 51 to the right of the value of down-curve A.

Should the condition monitored vary to decrease the values of the input current to the magnetic amplifier along curve 51, to that of down-curve A, the voltage across coil 35 will drop suddenly to those values of curve 50. The difference between the values of the up-curve A and the down-curve A, as measured along the range of input current values to the magnetic amplifier, is defined as the dead-band of the system at this calibration.

Should the value of resistor 36 be selectively decreased, the system will function between curves 50 and 51, along sets of up and down values B—B, C—C, D—D, or similar ones. The discovery is thus illustrated that the value of dead-band of the system is adjustable by changing the value of resistor 36.

Should the value of resistor 36 be reduced sufficiently, curve 50 will represent the function of the system. Although this will further reduce the dead-band, the lack of a sudden rise and sudden decrease in voltage appearing across coil 35 will deprive the system of snap-action or "triggering" as represented by the shifts along A—A, B—B, C—C and D—D. Without this sudden change in voltage, the solenoid relay will "chatter" its contacts and drastically shorten their life in addition to giving their erratic operation of the manifesting and/or control circuits.

As previously indicated, the adjustment of the value of D.-C. placed in coil 21 will establish the "triggering" with respect to the input current to magnetic amplifier section 12. Practical adjustment of the system is reiterated as accomplished by selecting the desired value of D.-C. in coil 21 and value of resistor 36. The result of proper adjustment is a satisfactorily small dead-band and sudden changes in voltage which will operate the relay of coil 35 positively.

Figure 5:
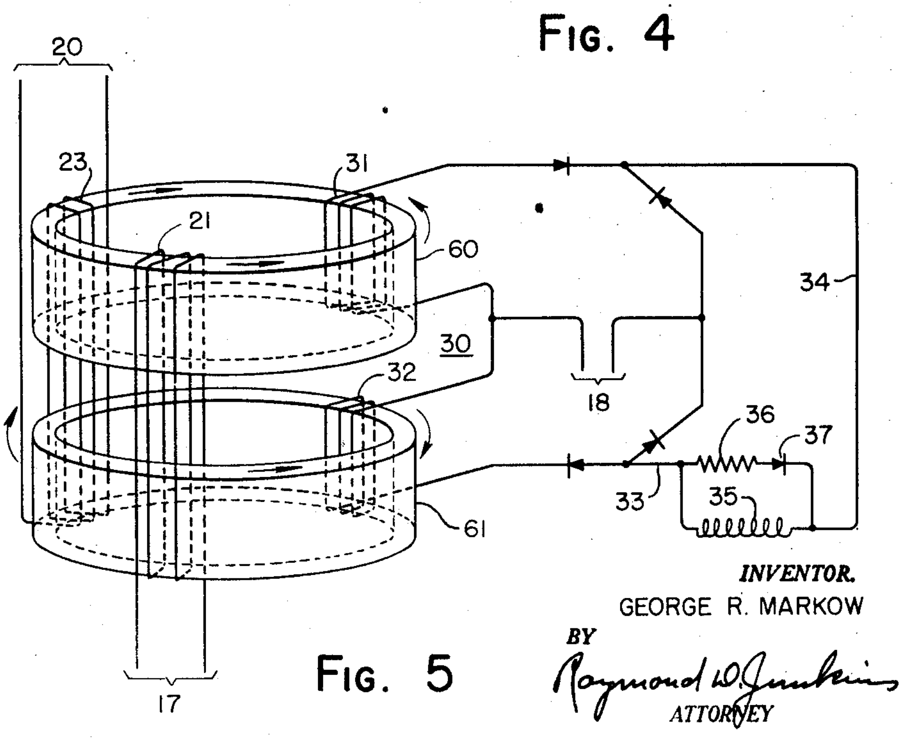
Fig. 5 is a diagrammatic perspective of the magnetic amplifier utilizing toroidal cores to more closely conform to the physical appearance of the preferred embodiment.

Finally, referring to Fig. 5, there is shown a representation of the preferred form of the magnetic amplifier section 12 as characterized by toroidal forms of cores for the saturable reactor component. Cores 60 and 61 are shown as a form for magnetic path 30 of Fig. 3. Bias winding 21 and output winding 23 are wound common to the cores 60 and 61 with direction for the flux they generate indicated by arrows. Output winding 31 is mounted on core 60 and output winding 32 is mounted on core 61, and both windings are electrically included in the circuit of rectifiers, supply, output leads and load which has been shown in Fig. 3. The resulting illustration aids comprehension of the physical form of the magnetic amplifier and the relation of its circuit to the complete circuit of the monitoring system.

What I claim as new, and desire to secure by Letters Patent of the United States, is:

1. A condition responsive system including, a balanceable network responsive to the condition and establishing an output signal representative of the magnitude of the condition, a magnetic amplifier circuit receiving the output signal of the balanceable network as an input and in turn establishing an output signal representative of the output signal from the balanceable network, electro-mechanical motive means responsive to the output of the magnetic amplifier to actuate manifesting means at one value of the input to the amplifier circuit during an increase in the magnitude of the input and at a different value during a decrease in the magnitude of the input to the amplifier, and means in the circuit between the magnetic amplifier circuit and motive means for establishing a predetermined differential between the two values of the input to the magnetic amplifier circuit.

2. The system of claim 1 in which the means for varying the differential between actuation values of the input to the magnetic amplifier comprises a rectifier and resistor arranged in series and shunting the magnetic amplifier output.

3. The system of claim 2 in which the electro-mechanical motive means comprises a solenoid type relay which operates electric switches which are in circuit with the magnetic amplifier and solenoid relay.

4. The system of claim 3 in which the circuit between the magnetic amplifier and the solenoid relay is normally completed through a switch arranged to be an initial switch opened by the relay when actuated and in which a normally open manually controlled switch is arranged to shunt the relay-controlled switch and actuate the relay when the output signal of the magnetic amplifier is above a predetermined magnitude.

5. The system of claim 1 in which the magnetic amplifier includes; a pair of structures providing magnetic paths, a pair of input windings mounted common to the magnetic path structures to establish separate sets of flux in each path, a source of adjustable D.-C. supply for a first of the common windings, a circuit carrying the balanceable network output into the second common winding, a pair of output windings separately energized with A.-C. and each wound separately on one of the magnetic path structures, a rectifier bridge in circuit with the separately energized output windings and providing an output D.-C. signal as the magnetic amplifier output.

6. The system of claim 3 in which an annunciating apparatus including a pair of lights normally energized through a circuit providing power of predetermined magnitude is arranged to be alternately energized through a switch controlled by the solenoid relay with a circuit which raises the level of energization.

7. The system of claim 6 in which the lights are arranged to illuminate separate halves of a viewed area.

References Cited in the file of this patent

UNITED STATES PATENTS

| | | |
|---|---|---|
| 1,940,335 | Suits | Dec. 19, 1933 |
| 2,557,224 | Hornfeck | June 19, 1951 |
| 2,632,885 | Barclay | Mar. 24, 1953 |
| 2,650,342 | Ker | Aug. 25, 1953 |
| 2,700,759 | Ogle et al. | Jan. 25, 1955 |
| 2,719,885 | Ramey | Oct. 4, 1955 |
| 2,725,519 | Malick et al. | Nov. 29, 1955 |
| 2,777,098 | Duffing et al. | Jan. 8, 1957 |
| 2,807,006 | Collins et al. | Sept. 17, 1957 |
| 2,823,348 | Scorgie | Feb. 11, 1958 |
| 2,825,894 | Marmorstone | Mar. 4, 1958 |